Nov. 4, 1969     G. O. MADELUNG     3,475,906
HEAT EXCHANGER FOR AIRCRAFT AIR CONDITIONING SYSTEMS
Filed Feb. 28, 1967
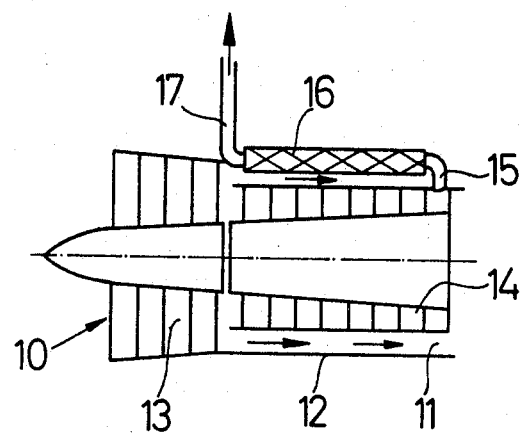
Gero Otto Madelung
INVENTOR.
BY
Robillard & Byrne 3,475,906
HEAT EXCHANGER FOR AIRCRAFT AIR
CONDITIONING SYSTEMS
Gero Otto Madelung, Munich, Germany, assignor to Entwicklungsring Sued G.m.b.H., Munich, Germany, a corporation of Germany
Filed Feb. 28, 1967, Ser. No. 619,458
Claims priority, application Germany, Apr. 1, 1966, E 31,367
Int. Cl. F02c 7/34; F02k 3/02, 11/00
U.S. Cl. 60—39.07        2 Claims

ABSTRACT OF THE DISCLOSURE

An air conditioning system for aircraft of the jet engine type having a heat exchanger disposed in the path of the bypass air and having means to take air from the high-pressure section of the engine and feeding same through the said heat exchanger. Thus, the air extracted from the high-pressure section is ultimately used as the cooling medium for air conditioning purposes.

---

Pneumatic systems, e.g. air conditioning systems in aircraft having jet engines, heretofore have been conventionally supplied with bleed air from the engine's compressor. This air was cooled by means of heat exchangers using ram air or bleed air from a low-pressure compressor as a cooling medium. The tapping of the bleed air in this manner has caused considerable difficulty since the air inlets, which increase the total drag of the aircraft, required special designs. In addition, special supply lines are required which cannot be installed without design problems and which, moreover, cause an increase in weight. Further, when the cooling medium is tapped from a low-pressure compressor, a considerable part of the engine performance is used at the expense of this bleeding, which at the same time, causes a higher specific fuel consumption. In both cases the cooling air flows into the free atmosphere and cannot be utilized, even to a fraction, for thrust gain.

An objective of this invention is to provide means for using the air flow of the engine bypass to cool a heat exchanger which receives its air from a high pressure section of the engine. One advantage of this arrangement is that considerable engine performance can be saved, special drag-increasing designs of the inlets for separately arranged heat exchangers are eliminated and total weight savings are gained by means of shorter supply lines.

Although the temperatures of the cooling medium in the bypass ducts are higher than the temperatures of a cooling medium taken from a source such as a low-pressure compressor or the ram air, the flow rate and density of the cooling memium in the bypass are remarkably higher than in prior art heat exchangers which were arranged separate from the engine. Additionally, air with considerably reduced temperature is carried in the supply lines for the air conditioning systems in the engine compartment itself.

These and other objects of the invention will become more apparent to those skilled in the art by reference to the following detailed description when viewed in light of the accompanying drawing, wherein:

The invention is shown diagrammatically in the figure.

The engine is indicated with the numeral 10 and the bypass with the numeral 11. The engine is covered with shroud 12.

From a low-pressure compressor 13, air enters the high-pressure compressor 14 in a conventional manner. Bleed air from the high-pressure sector of 14 is supplied to one or more heat exchangers 16 through a duct 15. The air cooled in the heat exchanger 16 by the air flow of the bypass chamber 11 is fed through a duct to an air conditioning system or other pneumatic system. The heat exchanger is a component of the engine 10 and is arranged directly in the bypass chamber 11 itself or as a part of the engine shroud 12. Thus, the bypass air flow of the engine 10 is directly used as a cooling medium.

I claim:
1. A system for providing cool air for an aircraft of a type powered by a jet engine having a high pressure compressor, a shroud about said compressor forming a substantially unrestricted air bypass chamber therebetween, an elongated heat exchanger partially located in said bypass chamber and positioned on said shroud, said heat exchanger having a longitudinal axis extending parallel to the longitudinal axis of said compressor, and a conduit of substantially smaller cross sectional area than that of said heat exchanger communicating said compressor and said heat exchanger to tap a portion of the air from said compressor and lead same to said heat exchanger, said conduit extending through said bypass chamber transversely to the longitudinal axis of said chamber.

2. A system for providing cool air for an aircraft of a type powered by a jet engine having a high pressure compressor, a shroud about said compressor forming a substantially unrestricted air bypass chamber therebetween, an elongated heat exchanger partially located in said bypass chamber and forming part of said shroud, said heat exchanger having a longitudinal axis extending parallel to the longitudinal axis of said compressor, and a conduit of substantially smaller cross sectional area than that of said heat exchanger communicating said compressor and said heat exchanger to tap a portion of the air from said compressor and lead same to said heat exchanger, said conduit extending through said bypass chamber transversely to the longitudinal axis of said chamber.

References Cited

UNITED STATES PATENTS

| | | | |
|---|---|---|---|
| 2,465,099 | 3/1949 | Johnson | 60—266 XR |
| 2,487,842 | 11/1949 | Whiteman et al. | 60—226 XR |
| 3,052,431 | 9/1962 | Compton | 60—267 XR |

FOREIGN PATENTS 987,625    3/1965    Great Britain.

CARLTON R. CROYLE, Primary Examiner

D. HART, Assistant Examiner

U.S. Cl. X.R.
60—226, 266; 230—114